TELEVISION AND LIKE TRANSMITTER INSTALLATIONS
Filed Dec. 5, 1952
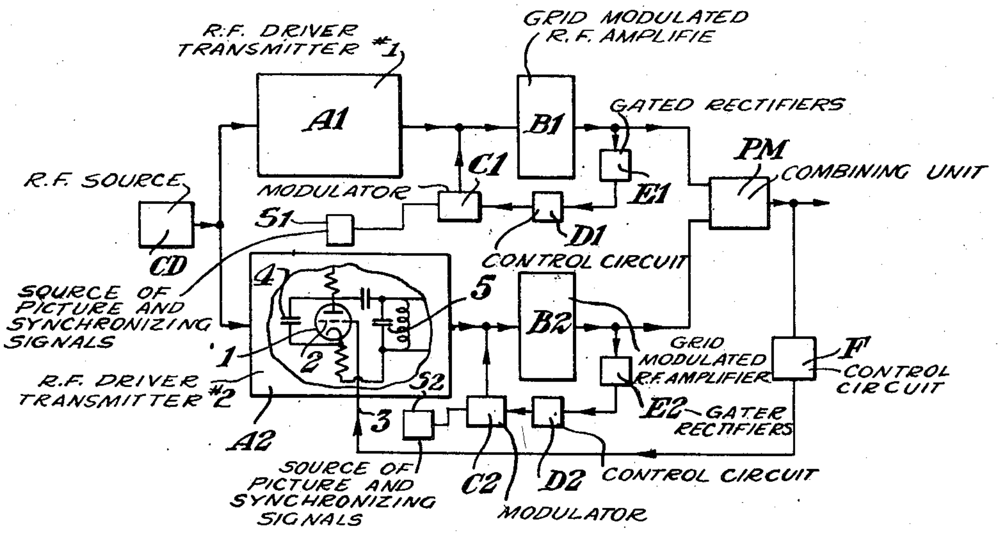
Inventor:
Victor James Cooper
Attorneys:
Baldwin & Wight United States Patent Office 2,861,123

Patented Nov. 18, 1958

2,861,123

TELEVISION AND LIKE TRANSMITTER INSTALLATIONS

Victor James Cooper, Writtle, England, assignor to Marconi's Wireless Telegraph Company Limited, London, England, a company of Great Britain Application December 5, 1952, Serial No. 324,271

Claims priority, application Great Britain February 11, 1952

3 Claims. (Cl. 178—7.1)

This invention relates to television and like transmitter installations and more particularly to such installations of the kind in which two or more television or like transmitters are required to be operated in parallel—a requirement which frequently and increasingly arises in modern television practice.

The present invention is concerned with the paralleling of transmitters whether there are only two to be operated in parallel or whether there are more than two. For the sake of brevity in description, however, the case of only two transmitters will be considered hereinafter, it being understood that the invention may be equally well applied however many the number of transmitters to be operated together, since, as will be apparent later, three transmitters (for example) are the same, from the point of view of this invention, as two pairs.

It is no easy matter to operate two television transmitters satisfactorily in parallel because any change in relative phase of the high frequency energies supplied to the common output by the two transmitters will produce a change in that output even though the transmitters provide constant outputs individually. There are, of course, known phase responsive circuit arrangements by which the high frequency phase relation of the outputs from the individual transmitters can be monitored and used to control the phase of one of them so as to maintain the desired in-phase relationship, but such phase responsive arrangements are complex, expensive and by no means easy to set up or maintain. The present invention seeks to provide improved and simplified means whereby transmitters may be operated satisfactorily in parallel without having to provide any phase sensitive automatic monitoring or control system.

The invention is not applicable broadly to the paralleling of all forms of television or like transmitters but only to the paralleling of those transmitters which themselves contain automatic means for maintaining a substantially constant output. Such automatic means are, of course, known per se and are in general used in modern television practice.

According to this invention a television or like installation comprises at least two television or like transmitters both of the kind comprising automatic means for maintaining substantially constant output, means for combining two outputs of the two transmitters in parallel, and means responsive to the relation between the combined output level and a predetermined level (which is selected at a value a little below that which obtains when the two transmitters are exactly in phase) for controlling the phase relation of the said two transmitters so as to maintain the combined output substantially at said predetermined level.

Though not limited to its application thereto the invention may be conveniently applied to the paralleling of transmitters in accordance with United States application Serial No. 107,981, filed Aug. 1, 1949 (Great Britain Aug. 10, 1948), now Patent 2,693,500, dated Nov. 2, 1954. This application describes an invention for maintaining the output level of a television transmitter substantially constant and according to the invention in the said application a television or like transmitter of the kind in which picture or like signals are transmitted as variations on one side of a predetermined level and synchronizing signals are transmitted as variations on the other side of said level, comprises means for deriving from the modulated output of said transmitter at instants of time when said predetermined level should be produced a control voltage which is a function of the level actually produced, and means for utilizing said voltage to control the source of modulating signal of the transmitter to maintain said level closely at a predetermined value.

In applying the present invention to the paralleling of two transmitters in accordance with the application above referred to, the outputs of the two transmitters are combined in a suitable combining circuit and the combined output level caused to control the phase of one of the transmitters to advance it or retard it as required to make the combined output maintain itself substantially at a predetermined level a little less than the combined output level which would be obtained if the two transmitters were exactly in phase. Thus if, for the sake of simplicity in description, it be assumed that the two transmitters provide equal outputs, the combined output (the maximum obtainable) will be twice that of one transmitter if the two transmitters are exactly in phase. In carrying out this invention the automatic phase adjustment is arranged automatically to maintain 98% or thereabouts) of the maximum obtainable combined output. A level a little less than (in this case 98% of) the maximum obtainable level is chosen in order that the control circuits may be sense responsive i. e. in order that the proper sense of phase correction may be obtained whether the departure from the predetermined level is a departure below that level or above it. As will be apparent, if it were sought to maintain the level at the maximum obtainable, any relative phase shift between the two transmitters would necessarily produce a correction of the same sign.

The invention is illustrated in the accompanying drawing which shows purely schematically and in block diagram form one embodiment of the invention and is applied to the paralleling of two transmitters each in accordance with United States Application Serial No. 107,981, supra.

Referring to the drawing each transmitter is of the kind with synchronizing signals in the "blacker than black" direction and they are arranged with a common radio frequency source CD which supplies two radio frequency driver stages A1, A2 one in each transmitter, each stage providing carrier input to its own grid modulated radio frequency amplifier B1 or B2 to which picture and synchronizing signals are also applied from a modulator C1 or C2 as in the usual well known way. The driver stages A1, A2 are similar except that the latter contains a preliminary, automatically controlled, phase shifter through which it is fed from the primary source CD and one form of which is indicated by the circuit in the broken away part of the block A2. The circuit therein shown is one of many known available circuits which will produce a phase shift in response to an applied direct current potential. As shown the phase shifter circuit is a reactance valve circuit comprising a valve 1, to whose control grid 2, a controlling direct current potential is applied over a lead 3, the valve having its anode cathode space shunted by a suitable condenser 4 and being connected in well known manner so as to act as a variable capacity in a tuned circuit 5. This particular phase control circuit, being well known per se, requires no further description here beyond stating that it will operate, in dependence upon the direct current potential applied over the lead 3, to vary the phase of the carrier frequency supplied from the source CD to the driver stage at A2.

Output from the grid modulated amplifiers B1, B2 are rectified in gated rectifiers E1, E2 and the resultants fed to suitable control circuits at D1 and D2 which control the modulators C1 and C2 so as to maintain the black level in the outputs of the individual transmitters substantially constant.

These means for producing constancy of black level individually in the two transmitters are as described in United States Application Serial No. 107,981, supra, and any of the circuits shown and described there may be used.

In accordance with this invention the outputs from the two transmitters are combined in a combining unit or power mixer PM of any known form the output from which is tapped off from the circuit which feeds the common load (not shown) to a control circuit F which is adapted to produce an output DC potential responsive to departures in the output level from the combining unit or mixer PM from a predetermined level e. g. 98% of the combined level which would be obtained if the two transmitters are exactly in phase. The apparatus at F may be generally similar to that used at E1 and E2 and as described in United States Application Serial No. 107,981, supra. Thus it may comprise means, such as a gated rectifier controlled by the synchronizing signals, for deriving direct current signals proportional to the instantaneous amplitudes from the combining unit or mixer circuit PM at short periods of time at the transitions from synchronizing signals to picture signals or vice versa, these direct current potentials being compared or differentially combined with a datum potential source also provided at F to produce a control potential which, after such amplification as may be necessary, is applied over the lead 3. The arrangement is such and the datum potential is selected at such value that so long as the combined output is 98% of the maximum obtainable (in the exact in-phase condition) the potential on lead 3 produces no phase shift in the input supplied to the driver stage at A2 but if the combined output rises above or falls below the 98% the potential fed over lead 3 changes and shifts the phase of the input to the driver stage at A2 in the direction required to restore the said 98%.

Feedback paths are established by the couplings to the combining unit or power mixer PM of the gated rectifiers E1 and E2 which derive control voltages from control circuits D1 and D2. The control voltages are used for stabilizing the grid modulated amplifiers B1 and B2 by passing the voltages through certain stages of the modulators shown at C1 and C2. It will be understood that modulators C1 and C2 may comprise many amplifier stages for amplifying the modulating signals provided by the modulating source. Parts of the modulators C1 and C2 are in the feedback paths which provide the stabilizing voltages and the modulators are also effective upon the outputs of transmitters #1 and #2 for controlling the energy which is fed to the grid modulated radio frequency amplifiers B1 and B2.

In the foregoing description in connection with the drawing it has been assumed that the television transmitters have positive modulation so that the only periods of time over which constant power is produced are during the black level periods immediately following synchronizing pulses and prior to picture signals, the control arrangement at E1, D1 and C1 being arranged as described in United States Application Serial No. 107,981, supra, to produce the required control action during those periods. The invention is, however, not limited to transmitters with positive modulation for it is obviously equally applicable—indeed rather more easily applicable—to transmitters with negative modulation. In such transmitters, of course, peak power occurs for the whole of the synchronizing pulse periods and since the line synchronizing pulses are several times longer in duration than the black level periods in transmitters with positive modulation the gating periods (i. e. the synchronizing pulse lengths) which are then available for securing automatic control of level are considerably longer and also permit of the use of simplified means, such as a peak voltimeter type of circuit, for deriving the required direct current controlling potentials from the control circuit F, instead of the gated separator type of circuit required when the modulation is positive and the "reference" periods occur at an intermediate level.

While I have described my invention in certain of its preferred embodiments I realize that modifications may be made and I desire that it be understood that no limitations upon my invention are intended other than may be imposed by the scope of the appended claims.

I claim:

1. A television installation comprising at the same station at least two television transmitters having a common central radio frequency source and each having a separate source of picture and synchronizing signals connected with individual modulation circuits and each comprising automatic means for maintaining substantially constant output and each adapted to transmit picture signals as variations on one side of a predetermined level and synchronizing signals as variations on the other side of said level, a combining unit, means for combining the outputs of the two transmitters in parallel in said combining unit, and means operable in response to control potential derived from said combining unit and dependent upon the relation between the combined output level from said transmitter and a predetermined level a little below that which obtains when the two transmitters are exactly in phase for controlling the relative phase relation of the said two transmitters whereby the combined output is maintained substantially at said predetermined level.

2. A television installation comprising at least two television transmitters each adapted to transmit picture signals as variations on one side of a predetermined level and synchronizing signals as variations on the other side of said level, each transmitter including a modulating signal source, means for deriving from the modulated output of each transmitter at instants of time when said predetermined level should occur, a control voltage which is a function of the level actually produced, means controlled by said voltage for controlling said modulating signal source to maintain said level closely at a predetermined value, a combining circuit, means for combining the outputs of the two transmitters in said combining circuit and means operable in response to a control potential derived from said combining circuit and dependent upon the combined output level of said transmitters in said combining circuit for controlling the phase of one of the transmitters to maintain the combined output substantially at a predetermined level a little less than the combined output level which would be obtained if the two transmitters were exactly in phase.

3. An installation according to claim 1 which includes means for feeding the outputs from the two transmitters to said combining unit, and a control circuit fed from the output of said combining unit and adapted to produce an output direct current potential responsive to departures in the output level of the combining unit from a predetermined level, said control circuit being connected with one of said transmitters for applying said direct current potential thereto.

References Cited in the file of this patent

UNITED STATES PATENTS

| | | |
|---|---|---|
| 2,244,239 | Blumlain et al. | June 3, 1941 |
| 2,644,942 | Bedford | July 7, 1953 |
| 2,653,186 | Hurford | Sept. 22, 1953 |